United States Patent [19]

Proebstle et al.

[11] Patent Number: 5,646,973
[45] Date of Patent: Jul. 8, 1997

[54] BWR FUEL ASSEMBLY WITHOUT UPPER TIE PLATE

[75] Inventors: Richard A. Proebstle, San Jose, Calif.; Christian D. Frederickson, Wilmington, N.C.; Thomas G. Dunlap, Wilmington, N.C.; Edward A. Croteau, Wilmington, N.C.

[73] Assignee: General Electric Company, Schenectady, N.Y.

[21] Appl. No.: 542,254

[22] Filed: Oct. 12, 1995

[51] Int. Cl.⁶ ........................................ G21C 3/32
[52] U.S. Cl. .................... 376/434; 376/435; 376/444; 376/446
[58] Field of Search .................. 376/434, 435, 376/444, 446, 438

[56] References Cited

U.S. PATENT DOCUMENTS

| | | |
|---|---|---|
| 3,015,616 | 1/1962 | Sturtz et al. . |
| 3,197,381 | 7/1965 | Blake . |
| 3,344,036 | 9/1967 | Haslam et al. . |
| 3,366,546 | 1/1968 | Anthony et al. . |
| 3,395,077 | 7/1968 | Tong et al. . |
| 3,607,639 | 9/1971 | Van Santen et al. . |
| 3,697,376 | 10/1972 | Mefford et al. . |
| 3,992,259 | 11/1976 | Anthony et al. . |
| 4,038,137 | 7/1977 | Pugh . |
| 4,364,901 | 12/1982 | Feutrel . |
| 4,418,036 | 11/1983 | Gjertsen et al. . |
| 4,420,458 | 12/1983 | Dunlap et al. . |
| 4,492,668 | 1/1985 | Pilgrim, Jr. et al. . |
| 4,499,047 | 2/1985 | Borrman et al. ................ 376/434 |
| 4,560,532 | 12/1985 | Barry et al. . |
| 4,578,241 | 3/1986 | Borrman et al. . |
| 4,632,804 | 12/1986 | Wallander et al. . |
| 4,652,426 | 3/1987 | Boyle et al. . |
| 4,666,664 | 5/1987 | Doshi . |
| 4,683,117 | 7/1987 | Carlson et al. . |
| 4,749,547 | 6/1988 | Blomstrand et al. . |
| 4,895,697 | 1/1990 | Andersson et al. . |
| 5,327,471 | 7/1994 | Meier et al. . |
| 5,339,342 | 8/1994 | Meier et al. ................... 376/446 |
| 5,481,579 | 1/1996 | Johansson et al. ............. 376/446 |

FOREIGN PATENT DOCUMENTS

| | | |
|---|---|---|
| 3533317A1 | 3/1987 | Germany . |
| 64-57195 | 3/1989 | Japan ............................. 376/444 |
| 6-75076 | 3/1994 | Japan ............................. 376/434 |

*Primary Examiner*—Daniel D. Wasil
*Attorney, Agent, or Firm*—Nixon & Vanderhye P.C.

[57] ABSTRACT

A fuel bundle assembly for a nuclear reactor includes a lower tie plate; a transition piece underlying the lower tie plate; a plurality of fuel rods and at least one water rod seated on the lower tie plate and extending in substantially parallel relationship toward an upper end of the fuel bundle assembly, wherein a fuel bundle assembly lifting load is carried by load bearing members including certain of the fuel rods or by the at least one water rod; a plurality of spacers axially spaced along the at least one water rod and including means for laterally supporting each of the fuel rods; and a handle bar assembly at the upper end of the fuel bundle assembly connected to the load bearing members such that the plurality of non-load bearing fuel rods are supported only by the lower tie plate and the plurality of spacers.

23 Claims, 5 Drawing Sheets

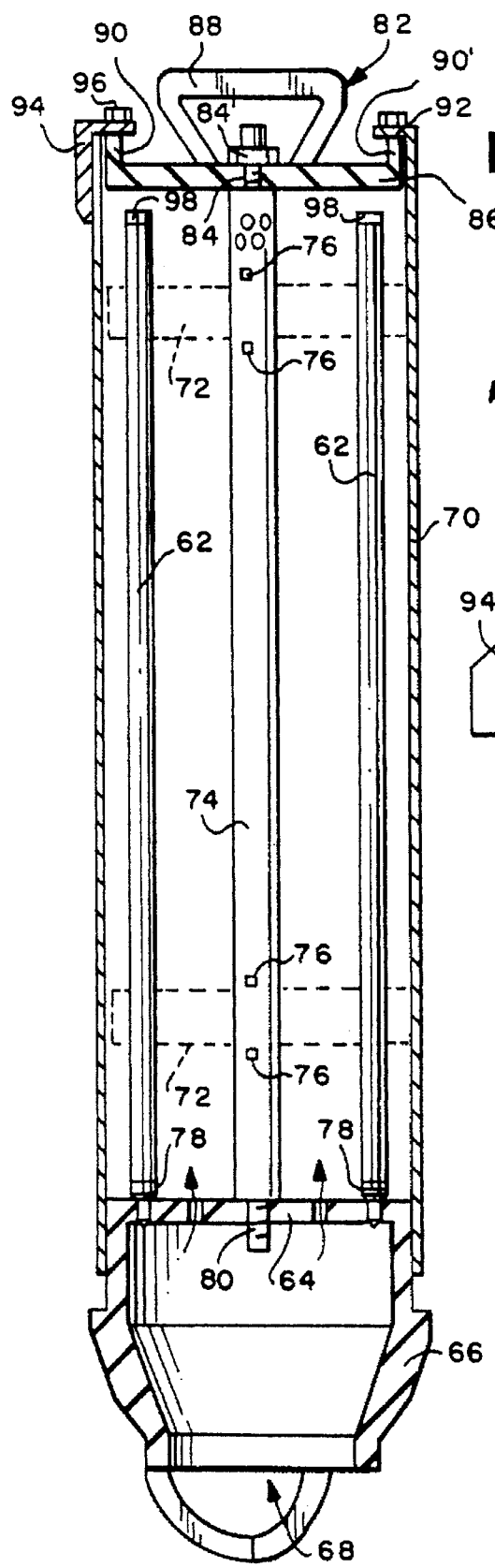
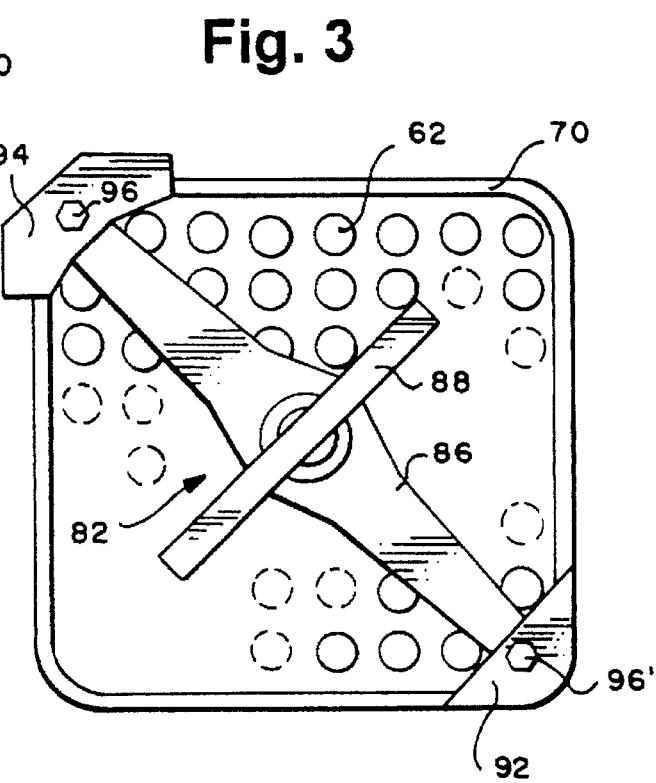

BWR FUEL ASSEMBLY WITHOUT UPPER TIE PLATE

TECHNICAL FIELD

This invention relates generally to boiling water nuclear reactor fuel bundle assemblies and specifically, to a fuel bundle assembly in which the conventional upper tie plate has been eliminated.

BACKGROUND

A nuclear fuel assembly consists of a matrix of parallel rods containing fissionable fuel and/or water coolant flow. The fuel rods are sealed at the top and bottom ends by end plugs welded to the fuel rods. These parallel rods are held at a fixed lateral spacing by spacer meshes located intermittently along the length of the fuel assembly. The matrix of fuel rods is supported at the bottom by a lower tie plate which provides lateral guidance for the fuel rod lower end plugs, and which includes flow holes providing an inlet for coolant flow into the fuel assembly. Similarly, the top end of the rod matrix is covered by an upper tie plate which restrains the fuel rod upper end plugs laterally and which includes flow holes providing an exit for coolant flow out of the fuel assembly. Each fuel bundle is enclosed within an open-ended channel also extending between the upper and lower tie plates.

One or more of the water and/or fuel rods may be used as structural members which rigidly fasten by some means to both the lower and upper tie plates for the purpose of lifting the assembly and maintaining a fixed distance between the lower and upper tie plates. Other fuel and/or water rods in the assembly not used as structural members are either restrained by a threaded or other releasable joint to the lower tie plate or are prevented from lifting off the lower tie plate by the upper tie plate or by expansion springs. Since reduced diameter sections of the upper end plugs typically extend through the upper tie plate holes, the fuel rods are free to expand in length until the shoulder on the upper end plug contacts the upper tie plate or until the expansion springs are fully compressed.

FIG. 1 illustrates in simplified form, components of a conventional fuel bundle assembly for a boiling water nuclear reactor. Specifically, the fuel bundle assembly 10 includes a plurality of fuel rods 12 extending in parallel relationship between an upper tie plate 14 and lower tie plate 16. The fuel rods 12 are typically arranged in a square array best understood from FIG. 1A. Centrally located within the fuel rod array is a water rod 18 also extending between the upper and lower tie plates. The lower tie plate 16 as shown is an integral part of a transition piece TP which includes at its lower end a coolant inlet 20. The entire fuel bundle is enclosed within an open-ended channel 22 of substantially square cross section (see also FIG. 1A.)

The fuel rods typically are provided at upper and lower ends with end plugs 24, 26. The lower end plugs 26 are seated within apertures 28 formed in the lower tie plate 16. The lower tie plate 16 is also formed with a plurality of coolant flow apertures 30. Similarly, the upper end plugs 24 of the fuel rods 12 are seated within apertures 32 formed in the upper tie plate 14, and the tie plate 14 is provided with coolant flow openings 34. The arrangement of apertures for receiving fuel rod end plugs and coolant flow openings is apparent from the grid-like construction of the upper tie plate 14 as shown in FIG. 1A, a similar grid-like arrangement being provided on the lower tie plate 16.

In this prior arrangement, water rod 18 is the load bearing structure by which the fuel bundle assembly may be lifted via handle 46. More specifically, the water rod 18 is threaded into the lower tie plate 16 by means of a threaded stud or end plug 36, while the upper end of the water rod 18 is threadably secured to the upper tie plate 14 by means of a threaded stud 38 and nut 40. An arrangement generally of this type is described in U.S. Pat. No. 5,327,471.

The water rod is also formed at its lower end with a plurality of side entry coolant openings 42, and at its upper end with a plurality of side exit apertures 44. Other coolant opening configurations, such as axially oriented openings are also common (see the '471 patent).

It is also noted here that the upper tie plate 14 may support the channel 22 by means of upper tie plate extensions 48, 50 which bear directly on corner gussets 52, 54 welded at the upper end of the channel. A channel guide 56 is also secured at one end of the channel and, in conventional fashion, serves to space adjacent fuel bundle assemblies within the reactor core. With this arrangement, while the water rod 18 is the load bearing number, the upper tie plate 14 is connected to the channel 22 so that the channel is lifted out of the core along with the fuel bundle. The upper tie plate can be disconnected from the channel, however, by removal of bolt 58, permitting the channel itself to be lifted off the fuel bundle assembly.

Expansion springs (not shown) may be used to push downward on the upper end plug shoulders 59, biasing the fuel rods downwardly upon the lower tie plate 16. Such springs extend between the shoulders 59 and the underside of tie plate 14 in the usual fashion, so that the fuel rods are free to expand in length until the springs are compressed fully between the upper end plug shoulders and the upper tie plate. With the use of expansion springs, the rods used as structural members (the water rod 18 in the example provided) are typically loaded in tension and the remainder of the rods with expansion springs are loaded in compression.

In designing a nuclear fuel assembly, one of the limiting constraints for very high exposure capabilities is the pressure built up in the fuel rods due to fission gas release. Also, the differential irradiation growth of the fuel rods and water rods becomes more significant at high exposures, requiring very long end plug extensions which are guided laterally by bosses in current upper tie plate designs. These long end plug extensions reduce the length available for the fuel rod plenum used to accommodate the fission gas release. The upper tie plate and upper end plugs designs currently used require complex machining, and these components, as well as the expansion springs, are costly.

DISCLOSURE OF THE INVENTION

The object of this invention, therefore, is to address the problems noted above, and includes the complete elimination of the upper tie plate grid structure which currently guides the upper ends of the fuel rods laterally, in favor of only a relatively small handle bar assembly. The handle bar assembly attaches directly to the fuel and/or water rods used as structural members, and optionally to the channel. By eliminating the upper tie plate grid, the fuel rods may be extended in length to a point that adequate clearance with the upper handle of the fuel assembly and the fuel handling equipment is maintained. The upper end plugs may also be shortened to thereby allow for the further extension of the fuel rod plenum length. Elimination of the upper tie plate with its complex grid construction also reduces the flow restriction and pressure drop at the top of the bundle, and provides an opportunity to reduce the overall cost of fuel assembly fabrication.

An additional benefit is that some of the fuel rods can be removed from the bundle without having to remove any other structural members from the upper end of the bundle.

The invention disclosed here includes parallel fuel and/or water rods with spacing maintained at a fixed distance by spacer meshes located intermittently along the length of the fuel assembly. As in the prior art, the matrix of fuel rods is supported at the bottom by a lower tie plate which may also guide the fuel rod lower end plugs laterally. One or more of the water and/or fuel rods are used as structural (i.e., load bearing) members, fastened by suitable means to the lower tie plate for the purpose of lifting the assembly. At the top end, a handle bar assembly is used which includes a handle for lifting the bundle, and an attachment mechanism for securing the handle bar assembly to those load bearing fuel and/or water rods used to lift the bundle assembly.

In one embodiment of the invention, the handle bar assembly is rigidly attached to a one-piece lower tie plate/ transition piece by means of a load bearing water rod. The handle bar assembly is also attached to the channel by means of a bolt in one corner of the channel which, in turn, is not rigidly attached to the lower tie plate/transition piece. In this arrangement, the channel is lifted with the fuel bundle assembly but does not carry any load other than its own weight. By removing the bolt, the channel can be lifted upwardly by itself and thus removed from the bundle separately.

In another embodiment, the handle bar assembly is attached to the lower tie plate via the water rod as described above, but is also provided with spring biased latch arms which serve to releasably attach the handle bar assembly to the channel. The channel, in turn, is rigidly secured to the transition piece (which supports but which is not otherwise attached to the lower tie plate) by screws or the like. In this way, the channel itself becomes a backup or redundant load bearing member in the event the primary structural member, i.e., the water rod, fails. By disconnecting the channel from the handle bar assembly, the fuel assembly including the upper and lower tie plates, fuel rods and water rod can be lifted out of the channel.

In still another, and preferred embodiment, the lower tie plate is again formed separately from the transition piece, and is detachable therefrom. The handle bar assembly is secured to the lower tie plate by a pair of load bearing water rods. As in the above described embodiment, spring loaded latch arms in the handle bar assembly engage apertures in opposite corners to the channel. At the lower end of the fuel bundle assembly, the channel is attached by screws or other suitable means to the transition piece. The lifting options in this preferred arrangement are similar to those described immediately above.

Because the upper tie plate grid is eliminated, the other non-structural fuel and water rods are free at their upper ends. If considered necessary or desirable, the uppermost (or an additional) spacer may be located near the upper ends of the rods to provide lateral support. Very short upper end plugs may now be used, since they function only to seal the upper ends of the fuel rods, and thus, the plenum regions of the fuel rods may be extended.

In the exemplary embodiments described herein, the water rod or rods (typically one or two are employed) are utilized as the load bearing, structural members. It should be understood, however, that the principal feature of this invention, i.e., the elimination of the upper tie plate, can be incorporated into other fuel bundle designs where fueled tie rods or other lifting rods are used as the load bearing members.

In its broader aspects, the present invention relates to a fuel bundle assembly for a nuclear reactor comprising a lower tie plate; a plurality of fuel rods and at least one water rod seated on the lower tie plate and extending in substantially parallel relationship toward an upper end of the fuel bundle assembly, wherein a fuel bundle assembly lifting load is carried by load bearing members including certain of the fuel rods or by the at least one water rod; a plurality of spacers axially spaced along the length of the fuel assembly and including means for laterally supporting the plurality of fuel rods and at least one water rod; and a handle bar at the upper end of the fuel bundle assembly connected to the load bearing members such that the plurality of fuel rods other than load bearing fuel rods are supported only by the lower tie plate and the plurality of spacers.

Other objects and advantages of the invention will become apparent from the detailed description which follows.

BRIEF DESCRIPTION OF THE DRAWINGS

FIG. 2 is a simplified side elevation, partly in section, illustrating a fuel bundle assembly in accordance with this invention;

FIG. 3 is a plan view of the fuel bundle assembly shown in FIG. 2;

BEST MODE FOR CARRYING OUT THE INVENTION

Figure 1:
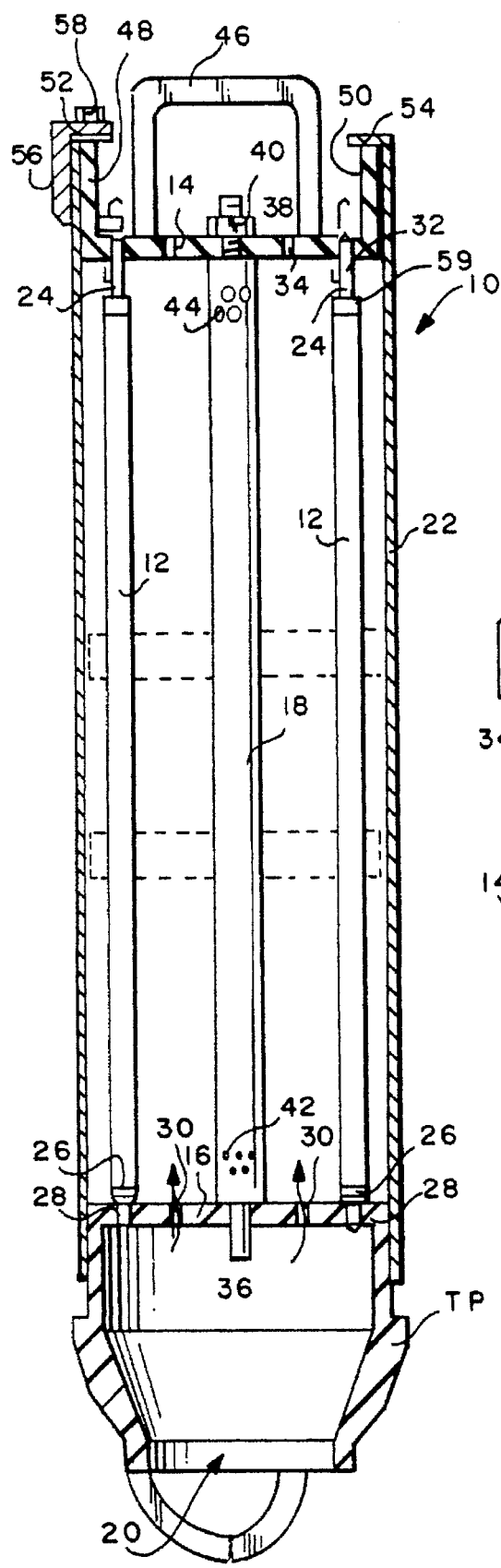
FIG. 1 is a simplified side elevation, partly in section, illustrating a typical fuel bundle assembly used in boiling water nuclear reactors.
Figure 1A:
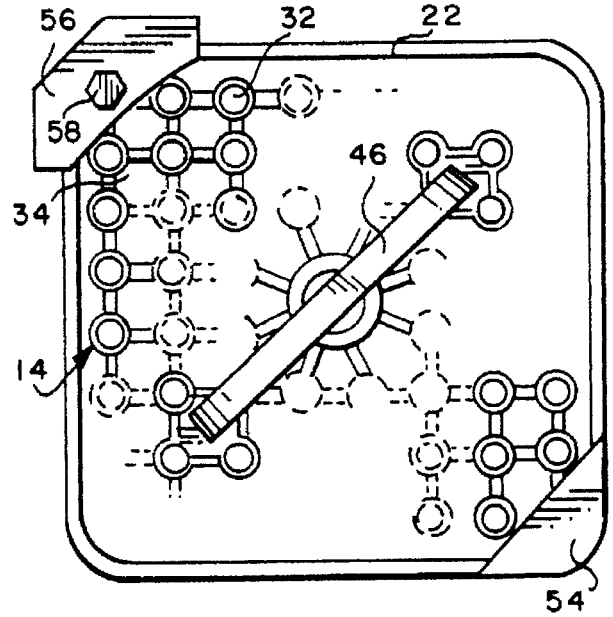
FIG. 1A is a plan view of the fuel bundle assembly shown in FIG. 1.

FIGS. 2 and 3 illustrate features of the present invention in a simplified manner, with many component parts removed for the sake of clarity and convenience. In fact, the illustrations in FIGS. 2 and 3 are generally similar in style to the prior arrangement shown in FIGS. 1 and 1A, so as to highlight the significantly different design features of this invention.

The fuel bundle assembly 60 includes a plurality of fuel rods 62 (typically in a 8×8, 9×9 or 10×10 array) supported on a lower tie plate 64 which, in this case, is formed integrally with a transition piece or lower nozzle 66 and which provides an inlet opening 68 for liquid coolant. A channel 70 encloses the bundle assembly. The fuel rods 62 are held in laterally spaced, substantially parallel arrangement by means of a plurality of spacers (two shown in phantom at 72) vertically spaced along the bundle in conventional fashion. These spacers are mounted on a centrally located water rod 74 extending upwardly through the center of the bundle. Tabs 76 are welded onto the water rod 74 to locate the spacers in the desired axial locations along the length of the water rod. The specific structure of the spacers is not a part of this invention, however, and they need not be described further. Note, however, that the uppermost spacer has been located closer to the upper ends of the fuel rods 62 than in conventional constructions in order to provide additional lateral support.

In current fuel bundle designs, the full length fuel rods are provided with end plugs seated in bosses formed in the lower tie plate. For partial length fuel rods, it is preferred that additional means be provided by which the rods are retained in the lower tie plate 64, and this is usually achieved by, for example, threading. As shown in FIG. 2, the fuel rods 62 are fitted at their lower ends with end plugs 78 which simply seat within bosses formed in the lower tie plate 64 in conventional fashion. Other retaining means, e.g., end plugs formed with spring fingers (described further below) or bayonet type connections, are suitable for partial length rods, although fasteners of this type may also be desirable in some instances for the full length fuel rods. Nevertheless, enhanced fastening is not considered essential for purposes of this invention.

The water rod 72 is also provided with a lower end plug 80 which is preferably threaded into the lower tie plate 64.

At the upper end of the fuel bundle assembly 60, the conventional upper tie plate, which would normally receive the upper ends of the fuel rods 62, and rigidly connect to special fuel rods serving as tie rods (also rigidly connected to the lower tie plate) has been eliminated. In its place, applicant has provided a handle or lifting bar assembly 82 which rigidly connects to the upper end of the water rod 74 by means of a threaded end plug 84 and associated nut 84'. The handle bar assembly 82 is located above the upper free ends of the fuel rods 62 as shown in FIG. 2. The handle bar assembly 82 is formed with a lifting bar 86 and a handle portion 88 which, in this embodiment, extends perpendicular to the bar 86, as best seen in FIG. 3. Lifting bar 86 extends into opposite corners of the channel 70 and provides lateral restraint of the handle bar assembly by the channel.

It will be appreciated that the handle bar assembly 82 may be used to lift the entire fuel bundle assembly including the fuel rods, water rod, and lower tie plate/transition piece, and that the lifting load is carried essentially solely by the water rod 74.

In the embodiment shown, the lifting bar 86 is formed with upward extensions 90, 90'. Extension 90' engages a corner gusset 92 in one corner of the channel while extension 90 engages a channel guide 94 mounted in an opposite corner of the channel 70. Bolts 96, 96' may be used to rigidly secure the handle bar assembly to the channel 70. This connection can be used to lift the channel and also to support the water rod laterally at the center of the fuel channel. With this arrangement, the entire assembly including the fuel rods 62, water rod 74, lower tie plate/transition piece 66 and channel 70 can be lifted from the core by means of handle bar assembly 82.

In addition, the handle bar assembly 82 can be detached from the channel 70 by removal of channel guide 94 and bolts 96, 96' thereby allowing the channel 70 to be lifted from the assembly by itself. This option is facilitated by the fact that the channel 70 is not attached at its lower end to the lower tie plate/transition piece 66.

Figure 3A:
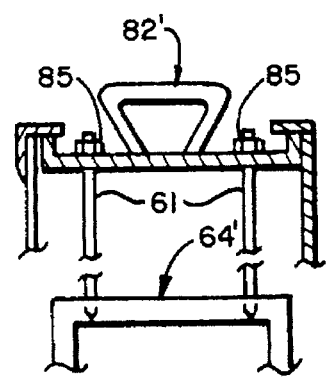
FIG. 3A is a partial simplified side elevation, illustrating a load bearing arrangement for a fuel bundle assembly in accordance with another embodiment of the invention.

FIG. 3A illustrates an alternative load bearing configuration where lifting rods 61 are provided which are neither fuel rods nor water rods. The lifting rods are threadably attached to the lower tie plate 64' and extend upwardly where they are secured to the handle bar assembly 82'. Specifically, the upper ends of the lifting rods 61 are threaded and secured by nuts 85. The fuel bundle assembly is otherwise substantially similar to that shown in FIG. 2.

Figure 4:
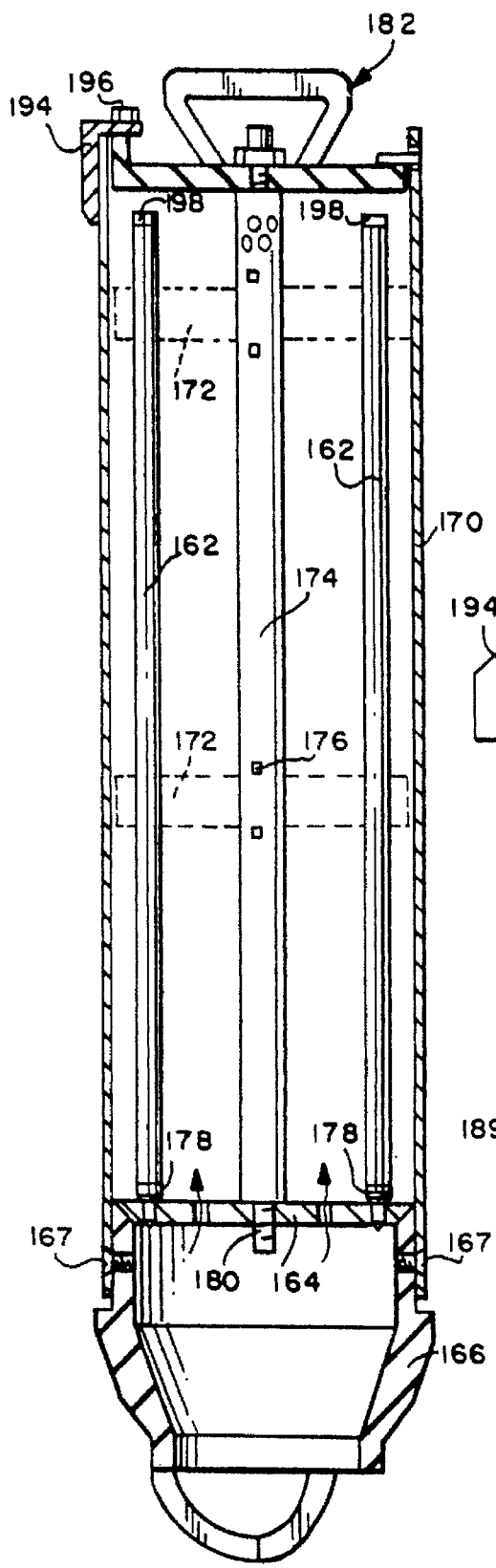
FIG. 4 is a simplified side elevation, partly in section, illustrating a fuel bundle assembly in accordance with another embodiment of this invention.
Figure 5:
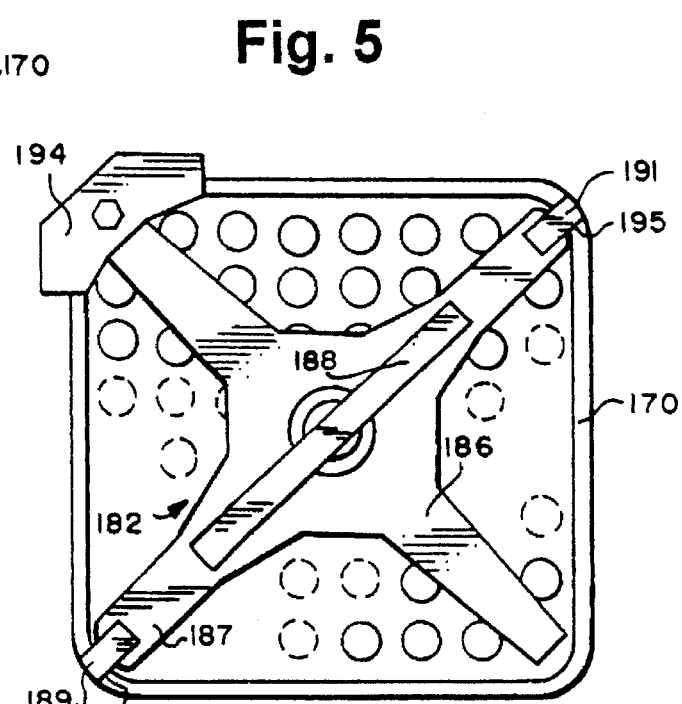
FIG. 5 is a plan view of the fuel bundle assembly shown in FIG. 4.

Turning to FIGS. 4 and 5, another embodiment of the invention is illustrated which is generally similar to that shown in FIGS. 2 and 3, but with differences noted below. For convenience, similar reference numerals, with the prefix "1" added, are used to identify corresponding components.

In this arrangement, the handle bar assembly 182 is formed with a pair of mutually perpendicular lifting bars 186 and 187, with the ends of the lifting bars extending into the four corners of the channel 170. Lifting bar 186 engages the channel 170 in the same manner as described above in conjunction with FIGS. 2 and 3. The bar 187, extending perpendicularly to bar 186, is provided at its ends with spring loaded latch pins 189 and 191 which engage within apertures 193 and 195 in the channel 170.

At the lower end of the assembly, the channel 170 is secured to the transition piece 166 by screws or other fastening means 167. Spacers 172 (two shown in phantom) are similar in construction and location to the spacers 72 shown in FIGS. 2 and 3.

Because the channel 170 is secured to the transition piece 166, there is no option to slide or lift only the channel away from the fuel bundle. The latch pins 189, 191, however, in combination with the rigid attachment between the channel 170 and transition piece 166, provides a load bearing backup to the structural (load bearing) water rod 174.

Moreover, by disconnecting the spring loaded latch pins 189, 191, and by removing the channel guide 194 (by means of bolt 194), the fuel bundle assembly (including the lower tie plate 164, fuel rods 162 and water rod 174) can be lifted out of the channel 170, since the lower tie plate 164 is merely seated on the transition piece 166.

It should be understood that while the latch pins 189, 191 are only shown schematically, the design and operation of such pins is further described in connection with the preferred embodiment shown in FIGS. 6–9 below.

A preferred embodiment of the invention is illustrated in FIGS. 6 through 9, where a fuel bundle assembly 200 includes a plurality of fuel rods 202 supported on a lower tie plate 204 which is formed separately from a transition piece or lower nozzle 206 and which provides an inlet opening for liquid coolant. The fuel rods 202 are held in laterally spaced, substantially parallel arrangement by means of a plurality of spacers 208, vertically spaced along the bundle in conventional fashion. Spacers 208 are supported on a pair of centrally located water rods 210, 212 extending upwardly through the center of the bundle. Spacers 208 are held on the water rods at fixed elevations by tabs as previously described. An open-ended channel 214 encloses the bundle assembly. Fuel rods 202 are unsupported by the handle bar assembly at their upper ends.

The full length fuel rods 202 may be seated within the lower tie plate 204 by means of conventional end plugs 216. Partial length fuel rods (one shown at 202') may be seated within the lower tie plate by end plugs 218 which are formed with axially extending spring fingers 220 which permit the partial length fuel rod to be "snap fit" into a receiving aperture formed in the lower tie plate. The spring finger type end plug retains the partial length fuel rod within the lower tie plate better than the conventional end plug as shown at 216. It should be understood, however, that the spring finger type end plugs are not necessarily essential for good retention of the partial length fuel rods 202', but on the other hand, they may also be useful in certain applications for use with full length fuel rods.

The water rods 210 and 212 may be secured to the lower tie plate 204 by means of threaded end plugs 222 which may be keyed to prevent rotation of the rods once fully threaded into place within the lower tie plate. These end plugs may each include a coolant flow metering bore (shown in phantom in the lower end plug of water rod 212 at 223), which is the subject of commonly owned application Ser. No. 08/542,345, filed Oct. 12, 1995 (atty. dkt. 1585-109) entitled "Water Rod Metering Within The Water Rod Lower End Plug", and which is incorporated herein by reference.

Figure 8:
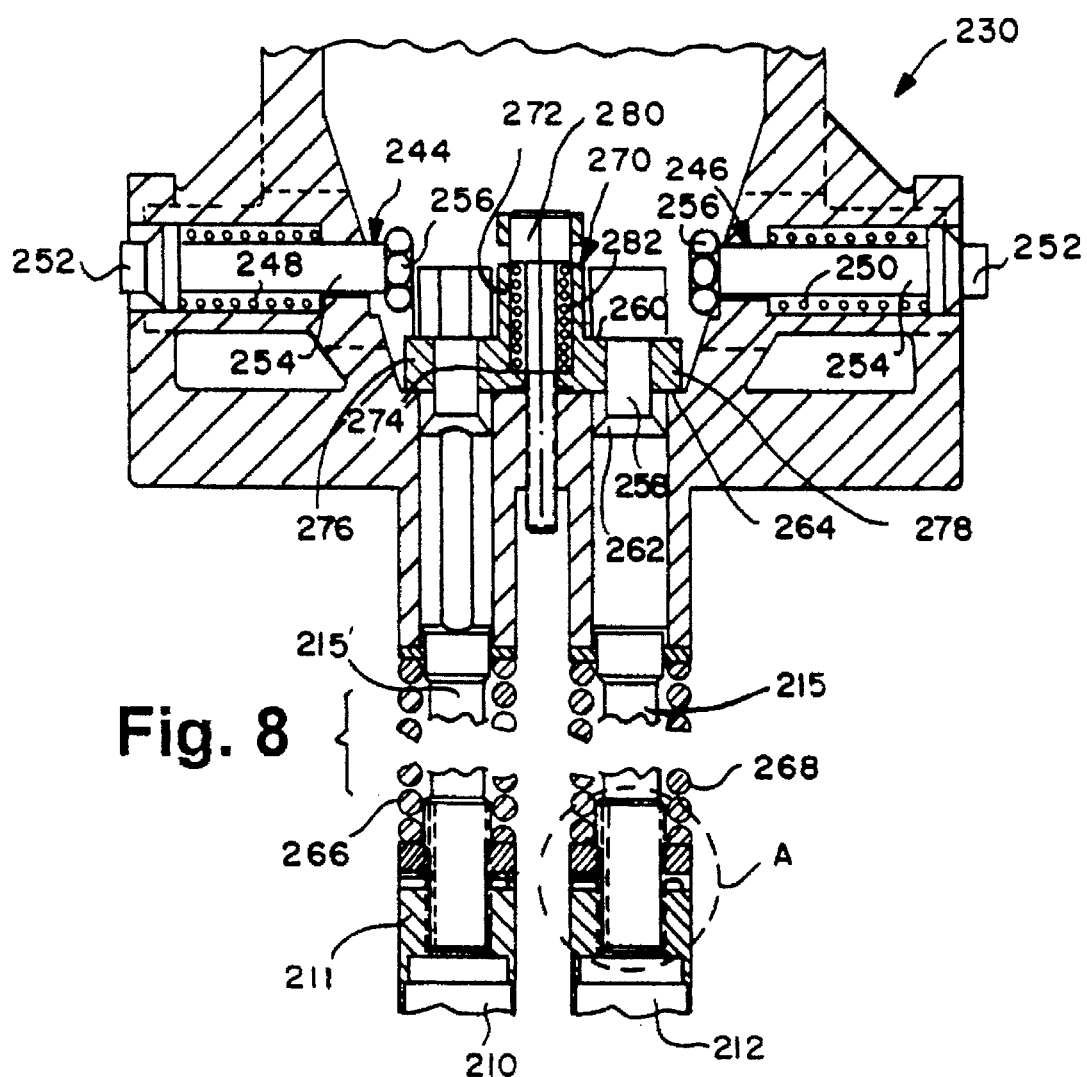
FIG. 8 is a partial section of the fuel bundle assembly illustrated in FIG. 6, showing the manner in which the water rods are attached to the lifting handle assembly.
Figure 9:
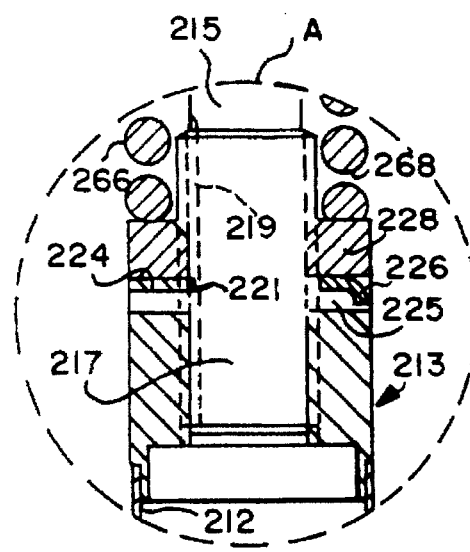
FIG. 9 is an enlarged detail A taken from FIG. 8.

Referring now also to FIGS. 8 and 9, the upper ends of the water rods 210 and 212 are welded to couplings 211, 213, respectively, and since each coupling, as well as the manner in which the water rods are ultimately connected to the handle bar assembly 230 is identical, only one need be described in detail. Accordingly, the coupling 213 threadably receives a tie bar or rod 215 in axial alignment with the water rod 212. The threaded end 217 of the tie rod 215 is machined to include an axially extending keyway 219 which receives a radial tab 221 on a locking washer 224. The coupling 213 is also provided with an axial slot 225 for receiving a bent over tab portion 226 of the lock washer, the latter being held in place by a threaded nut 228. The upper end of the tie rod 215 is slidably received in the handle bar assembly 230 as described further hereinbelow.

Figure 7:
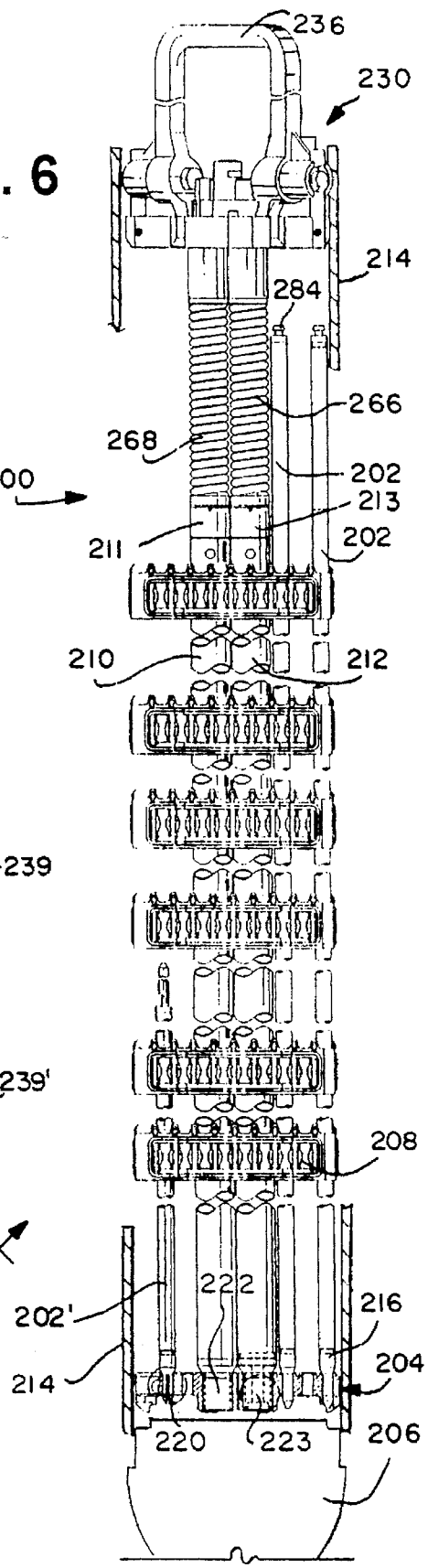
FIG. 7 is a simplified plan view of the bundle assembly shown in FIG. 6, illustrating only the lifting handle assembly and the surrounding channel.

The handle bar assembly 230 in accordance with the preferred embodiment of the invention includes a pair of mutually perpendicular cross bars 232 and 234 (FIG. 7) and an integral lifting handle 236. The lifting bar 232 extends into opposite corners of the channel 214, opposite ends of the lifting bar 232 being provided with corner braces 238, 240, each of which is provided with a pair of channel engaging projections 239 which engage adjacent sides of the channel. In other words, the projections 239 at each opposite end of the lifting bar 232 engage adjacent sides of the channel 214, but spaced away from the corner per se as best seen in FIG. 7. The other lifting bar 234 includes similar corner braces 238', 240', each of which is provided with a pair of channel engaging projections 239' which interact with adjacent sides of the channel 214 in the same manner as projections 239. The lifting bar 236 is also provided with spring loaded latch pins 244, 246 (see FIG. 8) which are spring biased by coil springs 248, 250 in a radial outward direction, so that the round projections 252 engage within similarly shaped apertures in the corners of the channel 214. Each of the pins 244, 246 includes a smooth shank portion 254 on which the coil spring is mounted, along with an enlarged head 256 which serves as a gripping point for a tool designed to pull the latching pins away from a channel latching position, i.e., radially inwardly.

With reference again to FIG. 8, the manner in which the water rod tie rods are secured to the lifting bar assembly is similar to a latch bar arrangement disclosed in commonly owned U.S. Pat. No. 5,481,579. That application is incorporated herein by reference. Briefly, continuing with the description only of tie rod 215 (rod 215' is identical), the upper portion of the tie rod 215 extends through a bore within the handle bar assembly 230 and is machined at its upper end to include an annular groove defined by a reduced diameter portion 258 extending between a flat shoulder 260 and a tapered shoulder 262. The groove extends above the top surface 264 of the handle bar assembly 230, noting that the handle bar assembly is movable axially downwardly against the action of coil springs 266 and 268 extending between the handle bar assembly 230 and the threaded nuts (one numbered 228) at couplings 211, 213. A latch bar 270 seated on surface 264 includes an upstanding center portion 272 counterbored to an internal shoulder 274, with the bore continuing at a reduced diameter through the remaining thickness of the bar. A pair of laterally extending generally horseshoe shaped hooks 276, 278, extend laterally away from the center portion 272 with the hooks 276, 278 having rounded tie rod engagement surfaces (engaging the reduced diameter portion 258 on rod 215 and similar portion on rod 215') facing in opposite directions. With the latch bar in place on the shoulder 264, the former may be rotated into the locking position shown in FIG. 8, and a bolt 280 and associated coil spring 282 are employed to secure the latch bar 270 to the handle bar assembly 230. Insofar as the bolt 280 is threaded into the assembly casting 230, and not onto the latch bar 270 itself, spring biased axial movement of the bar relative to the bolt is permitted to facilitate rotation of the latch bar into the locked position. A more detailed description of the construction and operation of the latching mechanism may be found in the '587 application.

Figure 6:
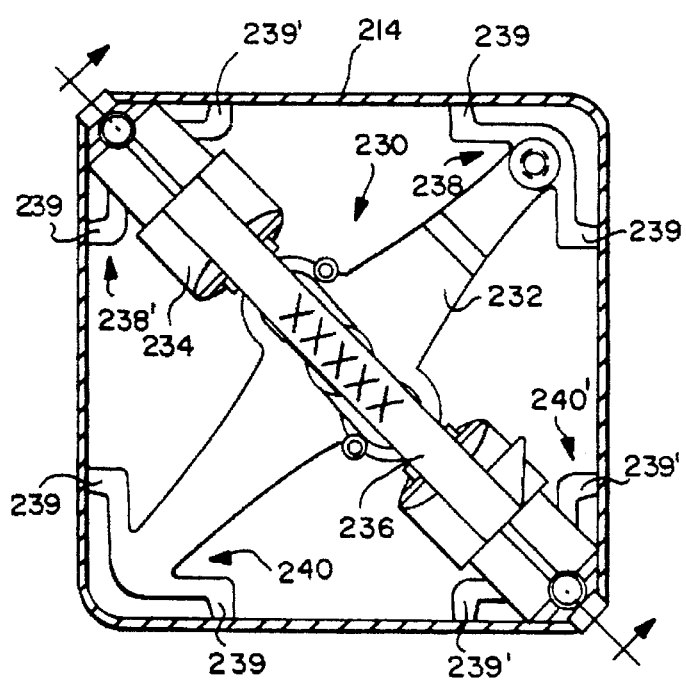
FIG. 6 is a simplified side elevation illustrating a fuel bundle assembly in accordance with a third and preferred embodiment of the invention.

It should also be noted here that with the elimination of the upper tie plate, the conventional fuel rod end plugs can be made shorter in axial length, as shown at 98 in FIG. 2, 198 in FIG. 4 and at 284 in FIG. 6, and this allows the fuel rod itself to be extended, thus maximizing fuel rod plenum length.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fuel bundle assembly for a nuclear reactor comprising:

a lower tie plate;

a plurality of fuel rods comprising all of the fuel rods in the fuel bundle assembly and at least one water rod seated on said lower tie plate and extending in substantially parallel relationship toward an upper end of the fuel bundle assembly;

a plurality of spacers axially spaced along said fuel bundle assembly and including means for laterally supporting each of said fuel rods and said at least one water rod; an improvement wherein no upper tie plate is utilized to support said plurality of fuel rods at upper ends thereof; and further wherein a fuel bundle assembly lifting load is carried by load bearing members including certain of said fuel rods or by said at least one water rod;

a handle bar assembly at the upper end of said fuel bundle assembly connected to said load bearing members such that with the exception of said load bearing members, all remaining fuel rods of said plurality of fuel rods and said at least one water rod are supported only by said lower tie plate and said plurality of spacers, said handle bar assembly configured so as to permit at least some of said fuel rods to be removed from said bundle assembly without removal of the handle bar assembly.

2. The fuel bundle assembly of claim 1 wherein said handle bar assembly includes an upwardly extending handle.

3. The fuel bundle assembly of claim 1 and including an open ended tubular channel enclosing said plurality of fuel rods and said at least one water rod.

4. The fuel bundle assembly of claim 3 wherein said handle bar assembly includes a lifting bar extending into opposite corners of said channel to provide lateral restraint of said handle bar assembly by said channel.

5. The fuel bundle assembly of claim 4 wherein said lifting bar is attached to said channel in said opposite corners to thereby allow said channel to be lifted by means of said handle bar assembly.

6. The fuel bundle assembly of claim 5 wherein a transition piece underlying said lower tie plate is connected to said channel, such that said transition piece is supported by said handle bar assembly through said channel as a redundant means for lifting the fuel bundle assembly.

7. The fuel bundle assembly of claim 6 wherein said handle bar assembly includes a pair of spring-loaded projections engaged within apertures provided in an upper end of said channel.

8. The fuel bundle assembly of claim 7 wherein said spring-loaded projections are biased toward said apertures.

9. The fuel bundle assembly of claim 4 wherein said lifting bar supports a channel guide and provides a point of attachment for the channel guide to the channel.

10. The fuel bundle assembly of claim 1 wherein some of said plurality of fuel rods extend substantially the entire length from the lower tie plate to a location just below the handle bar assembly, and some of said fuel rods are shorter in length and extend from the lower tie plate to an intermediate elevation of the fuel bundle assembly.

11. The fuel bundle assembly of claim 1 wherein at least some of said fuel rods are seated within apertures in said lower tie plate in a releasable nonthreaded relationship.

12. The fuel bundle assembly of claim 1 wherein at least some of the fuel rods are threadably secured to the lower tie plate.

13. The fuel bundle assembly of claim 1 wherein said fuel rods are fitted with relatively short end plugs at their upper ends, and wherein no expansion springs are seated on said end plugs.

14. The fuel bundle assembly of claim 1 wherein said at least one water rod has a lower end threadably secured to said lower tie plate.

15. The fuel bundle assembly of claim 14 wherein said lower end of said water rod is provided with one or more apertures for accepting coolant flow into the water rod.

16. The fuel bundle assembly of claim 1 wherein said at least one water rod has an upper end rigidly attached to said handle bar assembly.

17. The fuel bundle assembly of claim 1 wherein said at least one water rod has an upper end releasably retained on said handle bar assembly.

18. The fuel bundle assembly of claim 16 wherein said at least one water rod is attached to said handle bar assembly by a threaded connection.

19. The fuel bundle assembly of claim 1 wherein said at least one water rod comprises a pair of load bearing water rods.

20. The fuel bundle assembly of claim 19 wherein said pair of load bearing water rods are connected to a transition piece formed integrally with said lower tie plate.

21. The device of claim 7 wherein said lower tie plate rests on, but is not secured to, said transition piece such that, when said spring loaded projections are withdrawn, said lower tie plate, fuel rods, and said at least one water rod can be lifted out of said channel by said handle bar assembly.

22. A fuel bundle assembly for a boiling water nuclear reactor comprising:

a lower tie plate;

a plurality of fuel rods comprising all of the fuel rods in the fuel bundle assembly and at least one water rod seated on said lower tie plate and extending in substantially parallel relationship toward an upper end of the fuel bundle assembly, at least one lifting rod, containing no nuclear fuel material and no water flow, for carrying a lifting load of the fuel bundle assembly;

a plurality of spacers axially positioned along said fuel bundle assembly including means for laterally supporting said plurality of fuel rods and said at least one water rod; and a handle bar assembly at the upper end of said fuel bundle assembly connected to said at least one lifting rod wherein said plurality of fuel rods and said at least one water rod are not supported laterally by the handle bar assembly.

23. A fuel bundle assembly for a nuclear reactor comprising:

a lower tie plate;

a plurality of fuel rods comprising all of the fuel rods in the fuel bundle assembly and at least one water rod seated on said lower tie plate and extending in substantially parallel relationship toward an upper end of the fuel bundle assembly, wherein a fuel bundle assembly lifting load is carried by load bearing members including certain of said fuel rods or by said at least one water rod;

a plurality of spacers axially spaced along said fuel bundle assembly and including means for laterally supporting each of said fuel rods and said at least one water rod; and a handle bar assembly at the upper end of said fuel bundle assembly connected to said load bearing members such that with the exception of said load bearing members, all remaining fuel rods of said plurality of fuel rods are unsupported laterally at the upper ends thereof, said handle bar assembly configured so as to permit at least some of said fuel rods to be removed from said bundle assembly without removal of the handle bar assembly.

* * * * *